United States Patent
Hsueh et al.

(10) Patent No.: US 8,566,915 B2
(45) Date of Patent: Oct. 22, 2013

(54) MIXED-MODE AUTHENTICATION

(75) Inventors: Walter C. Hsueh, San Mateo, CA (US); Yordan I. Rouskov, Kirkland, WA (US); Spencer Wong Low, Redmond, WA (US); Daniel W. Crevier, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 293 days.

(21) Appl. No.: 12/910,411

(22) Filed: Oct. 22, 2010

(65) Prior Publication Data

US 2012/0102553 A1    Apr. 26, 2012

(51) Int. Cl.
*H04L 29/06* (2006.01)
(52) U.S. Cl.
USPC ............................................. 726/6
(58) Field of Classification Search
None
See application file for complete search history.

(56) References Cited

U.S. PATENT DOCUMENTS

| | | | |
|---|---|---|---|
| 7,240,192 B1 | 7/2007 | Paya et al. | |
| 2003/0061286 A1 | 3/2003 | Lin | |
| 2003/0200465 A1 | 10/2003 | Bhat et al. | |
| 2005/0268095 A1* | 12/2005 | O'Connor | 713/167 |
| 2006/0021004 A1 | 1/2006 | Moran et al. | |
| 2010/0050243 A1 | 2/2010 | Hardt | |

OTHER PUBLICATIONS

Luther, Craig E., "Cryptosystems that Secure Web Browsers", Retrieved at << http://www.infosecwriters.com/text_resources/pdf/Cryptosystems_SecureWebBrowsers.pdf >>, Dec. 11, 2005, pp. 8.
"How-To: Use NTLM Authentication for Single Sign-On", Retrieved at << https://www.socialtext.net/help-adminguide/index.cgi?how_to_use_ntlm_authentication_for_single_sign_on >>, Aug. 5, 2010, pp. 4.
"Oracle9i Application Server Security Guide", Retrieved at << http://www.di.unipi.it/~ghelli/didattica/bdldoc/A97329_03/core.902/a90146/features.htm >>, Aug. 18, 2010, pp. 28.

* cited by examiner

*Primary Examiner* — Brandon Hoffman
(74) *Attorney, Agent, or Firm* — Wolfe-SBMC (57) ABSTRACT

Techniques for mixed-mode authentication are described. In one or more embodiments, an authentication service may be implemented to selectively configure and issue authentication tokens based upon an optional secure mode that enables enhanced security. Clients may be provided with an option to choose between an insecure mode and a secure mode for authentications. Based on this choice, tokens may be configured to include an indication of whether the secure mode is disabled or enabled. When secure mode is disabled, an insecure token valid for both secure sites and other sites is issued to a client when the client is authenticated. When the optional secure mode is enabled, both secure and insecure tokens are provided to the client. The authentication services and/or other services may be configured to reject an insecure token when secure mode is enabled to prevent unauthorized use of a stolen token to access secure resources.

20 Claims, 11 Drawing Sheets

MIXED-MODE AUTHENTICATION

BACKGROUND

The use of the Internet and World Wide Web (or simply the Web) is ever increasing. To prevent unauthorized access to resources on the Web, providers may require clients to authenticate to gain access to the resources.

In a traditional approach for authentication, a client may submit credentials (e.g., username and password) to an authentication service, which validates the credentials and if appropriate issues a token that can be used to gain access to resources. In this approach, authentication may occur over a secure channel, such as using Secure Sockets Layer (SSL)/Hypertext Transfer Protocol Secure (HTTPS) for secure communications or using another type of secure channel. For some providers, though, a token that is obtained over a secure channel in response to a "single sign-on" may be valid to access resources from various sites including some sites that are secure (e.g., sites using HTTPS) and some sites that may employ less security (e.g., sites using Hypertext Transfer Protocol (HTTP)).

Although the token may be encrypted, when the token is used during insecure communications with a site (e.g., HTTP communications in the clear), the potential exists for an attacker to steal the token. The attacker may then "replay" the token (e.g., present the token to a service) and thereby obtain unauthorized access, even to secure sites. Thus, tokens issued in accordance with traditional authentication approaches may be considered insecure because the tokens are susceptible to being stolen and replayed to gain unauthorized access to resources.

SUMMARY

Techniques for mixed-mode authentication are described. In one or more embodiments, an authentication service may be implemented to selectively configure and issue authentication tokens based upon an optional secure mode that enables enhanced security. In particular, clients may be provided with an option to choose between an insecure mode and a secure mode for authentications in various ways. Based on this choice, authentication tokens may be configured to include an indication of whether the secure mode is disabled or enabled.

When secure mode is disabled, an insecure token valid for both secure sites and other sites is issued to a client when the client is authenticated. When the optional secure mode is enabled, both secure and insecure tokens are provided to the client. The authentication services and/or other services may be configured to reject an insecure token when secure mode is enabled to prevent unauthorized use of a stolen token to access secure resources.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Traditional approaches for client authentication may provide a client with a token that is issued in response to a "single sign-on." The token may be valid to access resources from various sites including some sites that are secure and some sites that employ less security. In this kind of mixed environment, an insecure token may be used over a secure channel with secure sites as well as over an insecure channel with other sites. Although the token may be encrypted, when the token is used during insecure communications with a site, the potential exists for an attacker to steal the insecure token. The attacker may then "replay" the token (e.g., present the token to a service) and thereby obtain unauthorized access, even to secure sites. Thus, the traditional approaches have security risks because the token is susceptible to being stolen and replayed to gain unauthorized access to resources.

Techniques for mixed-mode authentication are described. In one or more embodiments, an authentication service may be implemented to selectively configure and issue authentication tokens based upon an optional secure mode that enables enhanced security. Clients may be provided with an option to choose between an insecure mode and a secure mode for authentications. Based on this choice, authentication tokens may be configured with a mixed-mode flag or other data that indicates whether the secure mode is disabled or enabled. For example, a mixed-mode flag may be set to "0" or "1" to indicate that secure mode is disabled or enabled, respectively.

When secure mode is disabled, an insecure token valid for both secure sites and other sites is issued to a client when the client is authenticated. In other words, access to resources may occur in a way that is similar to traditional approaches when secure mode is disabled. However, even in the insecure mode, tokens may be configured to include the mixed-mode flag to differentiate tokens issued in the insecure mode from those issued in the secure mode.

When the optional secure mode is enabled, though, both secure and insecure tokens are provided to the client when the client is authenticated. The secure token is valid to access resources securely from a secure site, such as using SSL or other secure protocols. Generally, the secure token is configured for use over a secure channel and communication of the token over an insecure channel may be prevented or restricted. As the secure token is configured to be used over a secure channel it is unlikely to be stolen by an attacker. The insecure token is valid to access sites that may not support SSL to maintain compatibility with these sites. The insecure token may still be susceptible to being stolen during insecure communications with some sites. Various services from a service provider, though, can be configured to determine based on the mixed-mode settings whether secure mode is enabled and reject an insecure token when secure mode is enabled (e.g., mixed-mode=1). Accordingly, even if an insecure token is stolen under the secure mode, the token cannot be used to gain access to secure resources.

In the discussion that follows, a section entitled "Example Environment" describes an example environment and devices, which may be employed to provide mixed-mode authentication in various embodiments. Following this, a section entitled "Example Procedures" describes example techniques related to mixed-mode authentication in accordance with one or more embodiments. After that, a section entitled "Mixed-Mode Authentication Implementation Examples" describes example implementation details of mixed-mode authentication techniques that may be employed in one or more embodiments. Last, a section entitled "Example System" is provided and describes example systems and devices that can be used to implement one or more embodiments.

Example Environment

Figure 1:
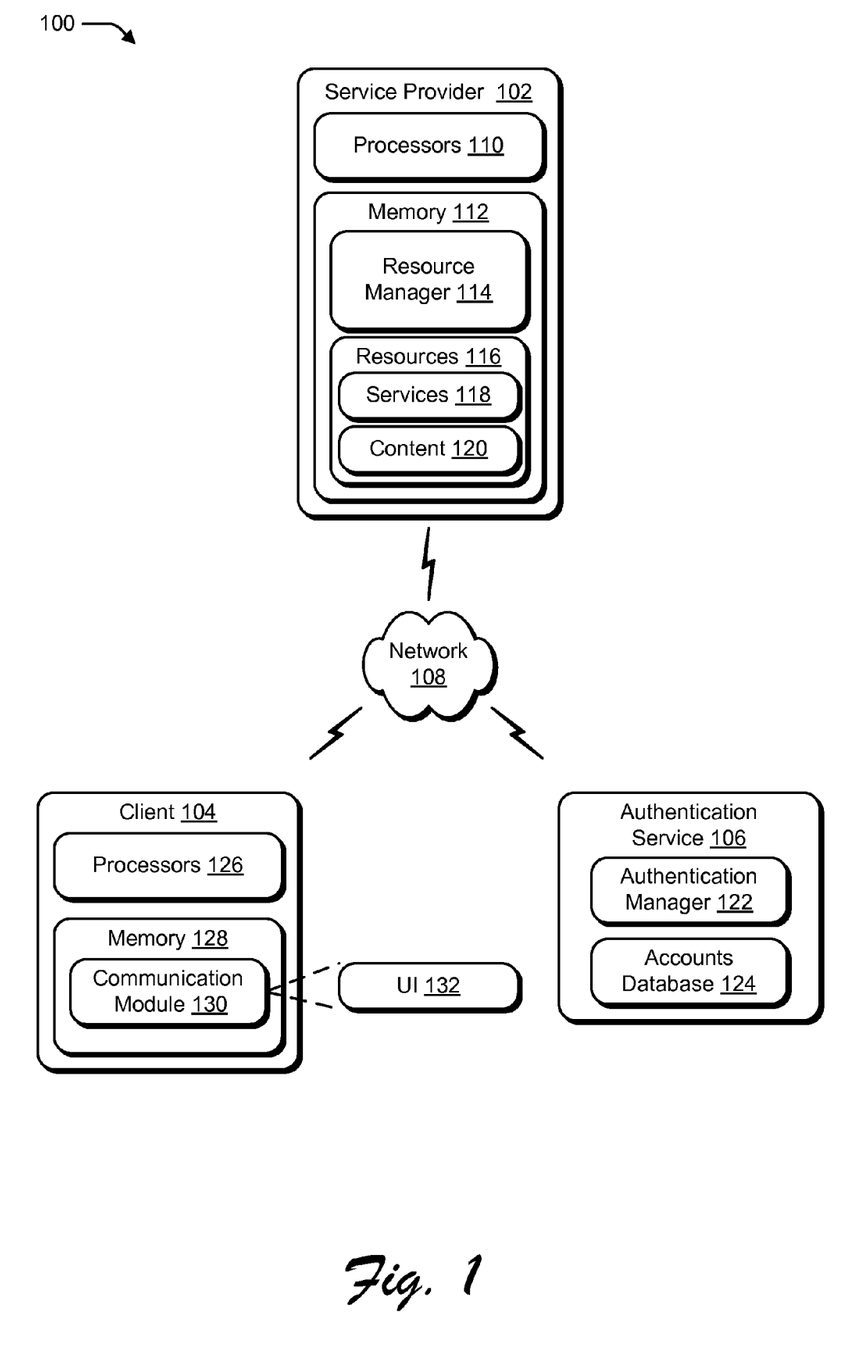
FIG. 1 is an illustration of an environment in an example implementation that is operable to provide mixed-mode authentication.

FIG. 1 is an illustration of an example environment 100 that is operable to provide techniques for mixed-mode authentication. The illustrated environment includes one or more service providers 102, one or more clients 104, and one or more authentication services 106 that are communicatively coupled, one to another, over a network 108. Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

For the purposes of the following discussion, a referenced component, such as service provider 102, may refer to one or more entities, and therefore by convention reference may be made to a single entity (e.g., the service provider 102) or multiple entities (e.g., the service providers 102, the plurality of service providers 102, and so on) using the same reference number.

The service provider 102 may have one or more processors 110 and memory 112. Service provider 102 is depicted as storing a resource manager 114 in the memory 112 that is executable via the one or more processors 110. The resource manager 114 represents functionality operable by service provider 102 to manage various resources 116 that may be made available over the network 108. For example, various resources 116 may be provided via web pages or other user interfaces that are communicated over the network for output by the one or more clients 104. The resource manager 114 may manage access to the resources 116, performance of the resources 116, configuration of user interfaces or data to provide the resources 116, and so on.

As illustrated, resources 116 made accessible by a service provider 102 may include one or more services 118 and/or content 120. A service provider 102 may provide one or more sites, which a client 104 can navigate to in order to access the resources 116. Sites accessible via a service provider 102 can include both secure sites and other sites that may employ lower security. The resources 116 can include any suitable combination of services 118 and/or content 120 typically made available over a network by one or more providers. Some examples of services 118 include, but are not limited to, a search service, an email service to send and receive email, an instant messaging service to provide instant messages between clients 104, and a social networking service to facilitate connections and interactions between groups of users who share common interests and activities. Additional examples of services 118 include a shopping service, a weblog service, productivity service, an authentication service as described herein, a news service, and an advertisement service to name a few. Content may include various combinations of text, video, ads, audio, multi-media streams, animations, images, web pages, web applications, device applications, content for display by a browser or other device application, and the like.

The example authentication service 106 is depicted as including an authentication manager 122 that is representative of functionality to authenticate clients to access various resources 116 that may be provided by one or more of the service providers 102. In at least some embodiments, the authentication manager 122 is configured to perform various techniques for mixed-mode authentication described above and below. The authentication service 106 may also include and/or manage an accounts database 124 that may be configured to store a variety of data related to user accounts with the one or more service providers 102. By way of example and not limitation, accounts database 124 may store account identifiers that may be used for authentication and access control (e.g., unique account IDs, usernames, passwords, and so on) and profile data that may correspond to personal data and pages accessible through various resources 116. Accounts database 124 may also include a configurable mixed-mode indicator or settings that controls whether a secure mode is enabled or disabled for a user account. A variety of other data is also contemplated, including service authorizations, user preferences, program files such as documents and spreadsheets maintained online, and other data typically associated with user accounts.

The authentication service 106 may be provided as a separate service as illustrated. For instance, authentication service 106 may be implemented by way of one or more standalone server devices having corresponding hardware (processors and memory) and software typically associated with server devices. Additionally or alternatively, an authentication service 106 may also be implemented by a service provider 102. Accordingly, services 118 made available from a service provider 102 can include an authentication service 106 configured to perform techniques for mixed-mode authentication described herein.

In operation, a client 104 may provide a username and password that is authenticated by the authentication service. When the authentication is successful, the authentication service may issue a token to enable access to corresponding resources 116. Tokens may be configured in a variety of ways. By way of example and not limitation, the term token as used herein may refer to encrypted cookies, encryption keys, digital certificates, binary large objects (BLOBs), a hash value, and/or other shared secrets or data that are suitable to make an authentication determination to determine whether a client 104, or other entity, "is who they say they are." In addition to being encrypted, tokens can be configured for use with particular protocols. For instance, insecure tokens may be configured for insecure communication protocols, such as HTTP. Likewise, secure tokens may be configured for corresponding secure communication protocols, such as SSL and/or HTTPS.

Authentication of the client 104 to an account may provide access to a single corresponding service provider 102 and/or to a single service 118 or other specific individual resources

116. Additionally or alternatively, a single authentication or "single sign-on" may correspond to many resources 116, such that authentication to a single account provides access to multiple resources 116 from one or more service providers 102, such as providing access to an entire suite of services 116 (e.g., search, email, instant messaging, shopping, social networking, and so forth).

In at least some embodiments, the authentication manager 122 may configure tokens (e.g., cookies) associated with authentications in a manner that makes them suitable for mixed-mode authentication. Tokens may be selectively configured for a secure mode or an unsecure mode based upon the configurable mixed-mode setting mentioned above that may be associated with user accounts. In the secure mode, both secure and insecure tokens may be provided to the client. In insecure mode, an insecure token is provided. Tokens may also be configured to include an indication that secure mode is enabled. Further discussion of selectively configuring and issuing tokens in accordance with mixed-mode authentication techniques may be found in relation to the following figures.

The one or more clients 104 are depicted as having one or more processors 126 and memory 128. To enable various communications over the network 108, the one or more clients 104 may also include a communication module 130. Communication module 130 may be configured to process user interface data from the service provider 102 to output a corresponding user interface 132 that enable interaction with various resources 116.

The communication module 130 is depicted as being stored in memory 128 and is also executable via the processor 126 to provide various interactions with service providers 102 and/or resources 116. Examples of such interaction include, but are not limited to, communicating one to another, navigating content 120, navigating different sites from one or more providers service 102, searching web pages, accessing services 118, accessing web pages and other resources 116, instant messaging, e-mail, and so forth. In at least some embodiments, the communication module 130 may be implemented as a browser or other suitable application to obtain and output web pages from the service provider 102 over the network 108. The communication module 130 may also represent a component of another application used to obtain resources 116 from the service providers 102. For example, a communication module 130 may be configured as a component of an email application, an instant messaging application, or other Web-enabled application of a client 104.

Having considered devices and components of an example environment, consider now example mixed-mode authentication procedures that may be implemented in the environment using the example components, as well as in other environments.

Example Procedures

The following discussion describes techniques for mixed-mode authentication that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to the example environment 100 of FIG. 1.

Figure 2:
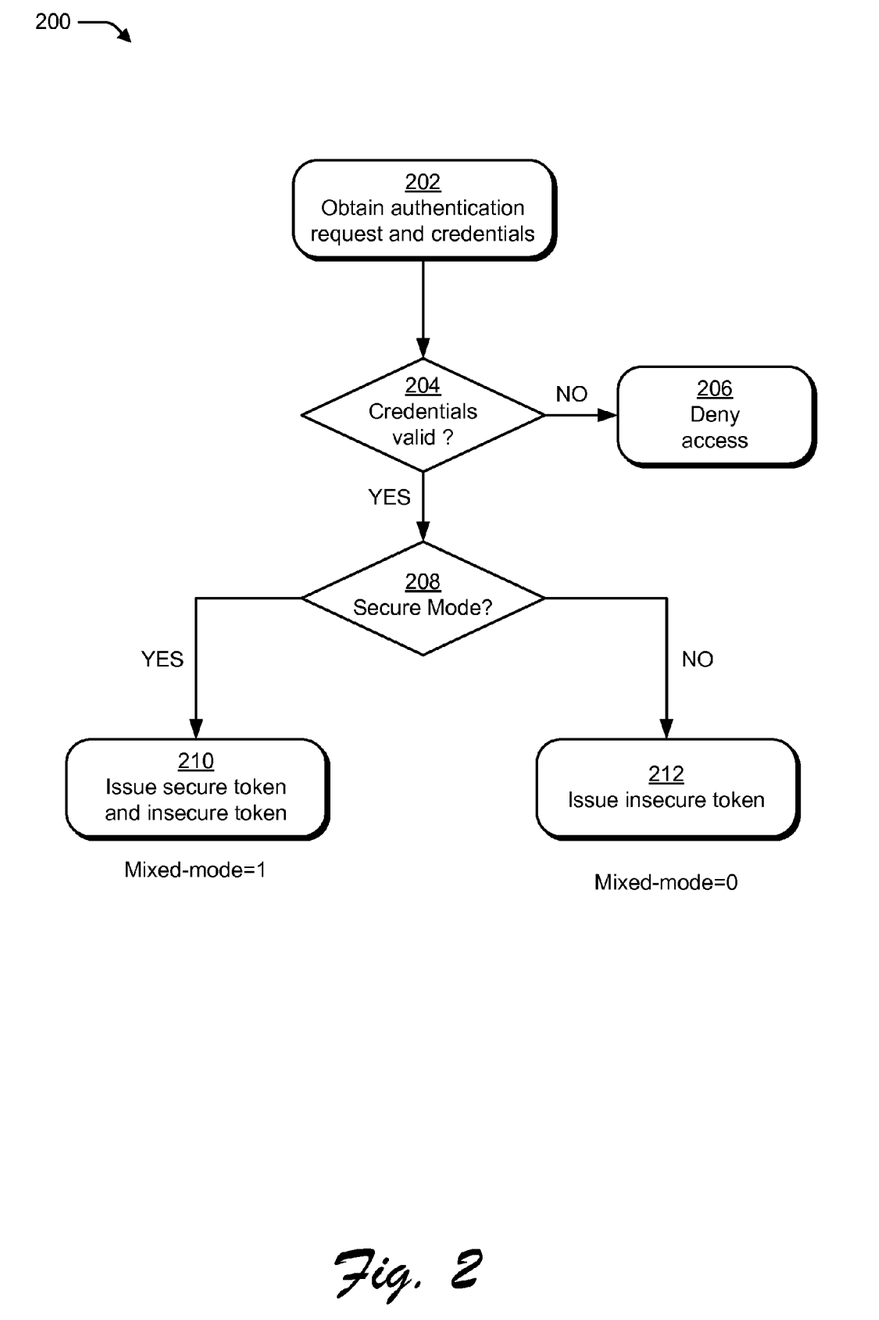
FIG. 2 is a flow diagram depicting an example procedure in which authentication is performed using mixed-modes.

FIG. 2 depicts a procedure 200 in an example implementation in which authentication is performed using mixed-modes. In at least some embodiments, procedure 200 may be performed by a suitably configured authentication service, such as by an authentication service 106 of FIG. 1 that includes or otherwise makes use of an authentication manager 122.

A request for authentication and credentials are obtained (block 202). For example a client 104 may seek authentication to obtain resources from a service provider 102. One way this may occur is by way of an authentication service 106. The client 104 may be redirected to the authentication service 106 when an attempt is made to access resources. At the authentication service 106, authentication manager 122 may cause a login interface to be output requesting input of credentials that may be input via the login interface by the client 104. The authentication manager 122 may then perform operations to authenticate the client 104.

In particular, a determination is made regarding whether the credentials are valid (block 204). For instance, the authentication manager 122 can check the validity of credentials provided by a client 104 (e.g., username and password) to authenticate the client 104 as discussed in relation to FIG. 1.

If the credentials are determined to be invalid, access is denied (block 206). For instance, access to resources 116 can be prevented and/or a request to retry the authentication may be sent to the client 104. In this case, the client is not "authenticated."

If the credentials are determined to be valid, the client is "authenticated" and a determination is made regarding whether secure mode is enabled (block 208). For example, authentication manager 122 may examine an account associated with the client 104 and/or the request to ascertain whether secure mode is enabled or disabled for the account. This may involve referring to data fields or other suitable account data associated with user accounts that indicate whether a secure mode is enabled or disabled for the account. Data suitable to determine whether secure mode is enabled may be referred to herein as mixed-mode indicators or settings. In at least some embodiments, users are provided an option to opt in or out of the secure mode. An option to enable secure mode can be provided at various times, such as when an account is created, when account preferences are updated, during authentication transactions, and/or when a site that is not secure is accessed. In one particular example, the mixed-mode indicator may be configured as Boolean mixed-mode field that is associated with accounts to indicate whether secure mode is enabled or disabled for the account. A value for the mixed-mode field is set accordingly when a user opts in or out of secure mode. The authentication manager 122 and/or a service provider 102 may then make use of the mixed-mode field to determine whether secure mode is enabled.

Based on this determination, the authentication manager 122 can selectively issue authentication tokens to the client. If secure mode is enabled, a secure token and an insecure token are issued to the client 104 (block 210). If secure mode is disabled, an insecure token is issued to the client 104 (block 212). For example, the secure token may be configured as an HTTPS cookie that is compatible with sites that use secure communications, such as secure sockets layer (SSL) or other secure protocols. The insecure token may be configured as an HTTP cookie that is compatible with sites that cannot or choose not to use secure communications. Providing both tokens in the secure mode enables enhanced security communications (e.g., HTTPS) using the secure token with secure sites and continued compatibility using the insecure token with sites that may not support secure communications and/or the security enhancements implemented by the secure mode.

Additionally, authentication manager 122 may configure both secure and insecure tokens to contain a mixed-mode flag that corresponds to the mixed-mode indicator for a corresponding account. The mixed-mode flag may be included with tokens in both the secure and insecure modes. In either case, the mixed-mode flag may be encrypted within the token to prevent tampering. This enables a service provider 102 to differentiate between tokens issued in secure mode from those issued in insecure mode. For example, the mixed-mode flag for both tokens issued in block 210 may have a value of "1" or "True" as secure mode is enabled. The mixed-mode flag for the insecure token issued in block 212 may have a value of "0" or "False" as secure mode is disabled.

Sites may be configured to make use of the mixed-mode flag included with tokens to understand whether the enhanced security of the secure mode is enabled for a corresponding account. In insecure mode, both secure sites and other sites may be configured to accept an insecure token. When an insecure token is used during insecure communications with a site (e.g., HTTP communications in the clear), the potential exists for an attacker to steal the insecure token. The attacker can then "replay" the insecure token (e.g., present the token to a service) and thereby obtain unauthorized access, even to secure sites. This type of attack is sometimes referred to as a man in the middle attack.

When secure mode is enabled, though, secure sites can be configured not to accept insecure tokens when the mixed-mode flag indicates that secure mode is enabled. In other words, a secure site may reject an insecure token when a corresponding mixed-mode flag has a value of "1" or "True." This effectively forces the secure token to be used for secure sites when a user opts into the enhanced security of the secure mode. Even if the insecure token is stolen by an attacker during an insecure communication, the stolen token includes the mixed-mode flag indicating that secure mode is enabled. Accordingly, the token will not be accepted by secure sites or other sites configured to reject tokens based on mixed-mode settings. Thus, enabling secure mode may prevent unauthorized access to sites that may occur in traditional approaches through man in the middle attacks.

Figure 3:
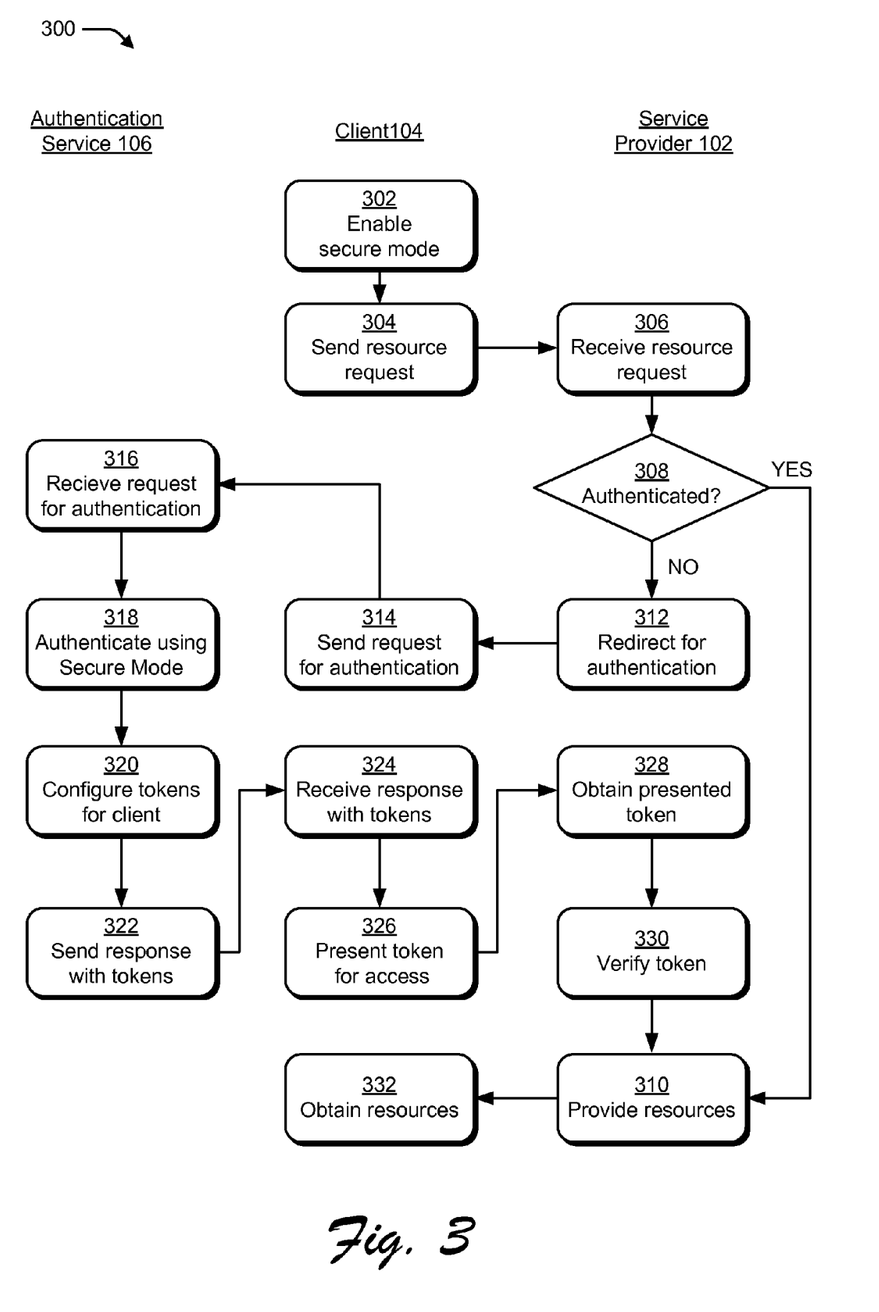
FIG. 3 is a flow diagram illustrating another example procedure for a system operable to implement mixed-mode authentication.

FIG. 3 is a flowchart illustrating an example procedure 300 for authentication of a client to access resources. In particular, FIG. 3 illustrates an example authentication sequence that may be employed when secure mode is enabled. Acts of procedure 300 illustrated on the left-hand side of FIG. 3 may be carried out by an authentication service, such as authentication service 106 of FIG. 1. Acts of procedure 300 illustrated in the middle of FIG. 3 may be carried out by a client 104. For example, the acts may be performed by a browser, or other suitably configured communication module 130 of a client 104, that enables interaction with various webpages, or other UI's, that are provided at least in part over the network 108. Acts of procedure 300 illustrated on the right-hand side of FIG. 3 may be carried out by a service provider, such as service provider 102 of FIG. 1.

At the browser, secure mode is enabled (block 302). For example, a user interface 132 output at the client 104 may provide functionality to enable a user to selectively choose between secure mode and insecure mode. This may occur during authentication or at another time such as when the user establishes an account, changes account settings, responds to a message, email, or other notification from the service provider 102, and so forth. When the user selects secure mode, a mixed-mode indicator associated with the user's account may be set accordingly. The browser sends a request to the service provider for resources (block 304). For instance, the browser may be navigated to a particular site, such as a home page or other resource page provided by the service provider 102. The service provider receives the resource request (block 306) and determines whether the client is authenticated (block 308). For instance, the client 104 may have previously obtained a token that is valid to access resources from the service provider 102. For a secure site in secure mode, this determination may involve determining if the client holds a valid secure token. An insecure token is not valid for a secure site when secure mode is enabled. Accordingly, if an insecure token is presented, the service provider may simply ignore the insecure token or otherwise reject the insecure token. If the client is authenticated, then the service provider responds to the resource request by providing the requested resources (block 310).

If the client is not authenticated, though, the service provider redirects the client for authentication (block 312). For instance, the client 104 may be redirected to authenticate with the authentication service 106. The redirection may cause the client to send a request for authentication (block 314) that is received by the authentication service (316). The authentication request may include credentials of the client 104, such as a username and a password, or other suitable credentials. Typically, the authentication occurs using a secure communication channel, such as SSL or another suitable secure protocol. The authentication service authenticates the client using secure mode (318). For instance, authentication manager 122 may check the credentials in the request against credentials for the account in the accounts database 126. The client 104 is authenticated when the credentials match. However, if the credentials do not match, the client may be prompted to re-input credentials and/or access may be denied.

Assuming authentication is successful, tokens are configured for the client (block 320). For instance, secure and insecure tokens that each include a mixed-mode flag may be configured in the manner discussed in relation to example procedure 200 of FIG. 2. In this example, the mixed-mode flag or other data for the secure and insecure tokens is set to indicate that secure mode is enabled (e.g., mixed-mode="1" or "true"). If instead secure mode is disabled, an insecure token with a mixed-mode flag set to indicate that secure mode is disabled may be configured at this point.

The configured tokens are sent by the authentication service (block 322) and received at the client (block 324). Again, this typically occurs using a secure channel so that the tokens are not susceptible to being intercepted or stolen by a third-party.

The client may then present the tokens for access to resources (block 326). As noted previously, the mixed-mode flag effectively forces the secure token to be used with secure sites. Less secure sites, though, may accept the insecure token. Thus, the client 104 can use the tokens that are obtained through the authentication sequence to access resources from both secure and other sites.

A site may obtain a token that is presented by a client (block 328) and verify the token (block 330). If the verification is not successful, the site may deny access and/or prompt the client 104 to re-authenticate. The verification of the token may include checking the mixed-mode flag to determine whether the secure mode is enabled. When secure mode is enabled, a secure site may be configured to deny a token based on the value of the mixed-mode flag. Thus, if an insecure token is presented using secure mode, verification of the token per block 330 will be unsuccessful. This prevents an attacker from using a stolen insecure token to access secured resources.

If the verification is successful, then the service provider 102 considers the client "authenticated" and therefore authorized to access corresponding resources 116. Accordingly, the service provider provides the requested resources (block 310) and the client obtains the resources (block 332).

Figure 4:
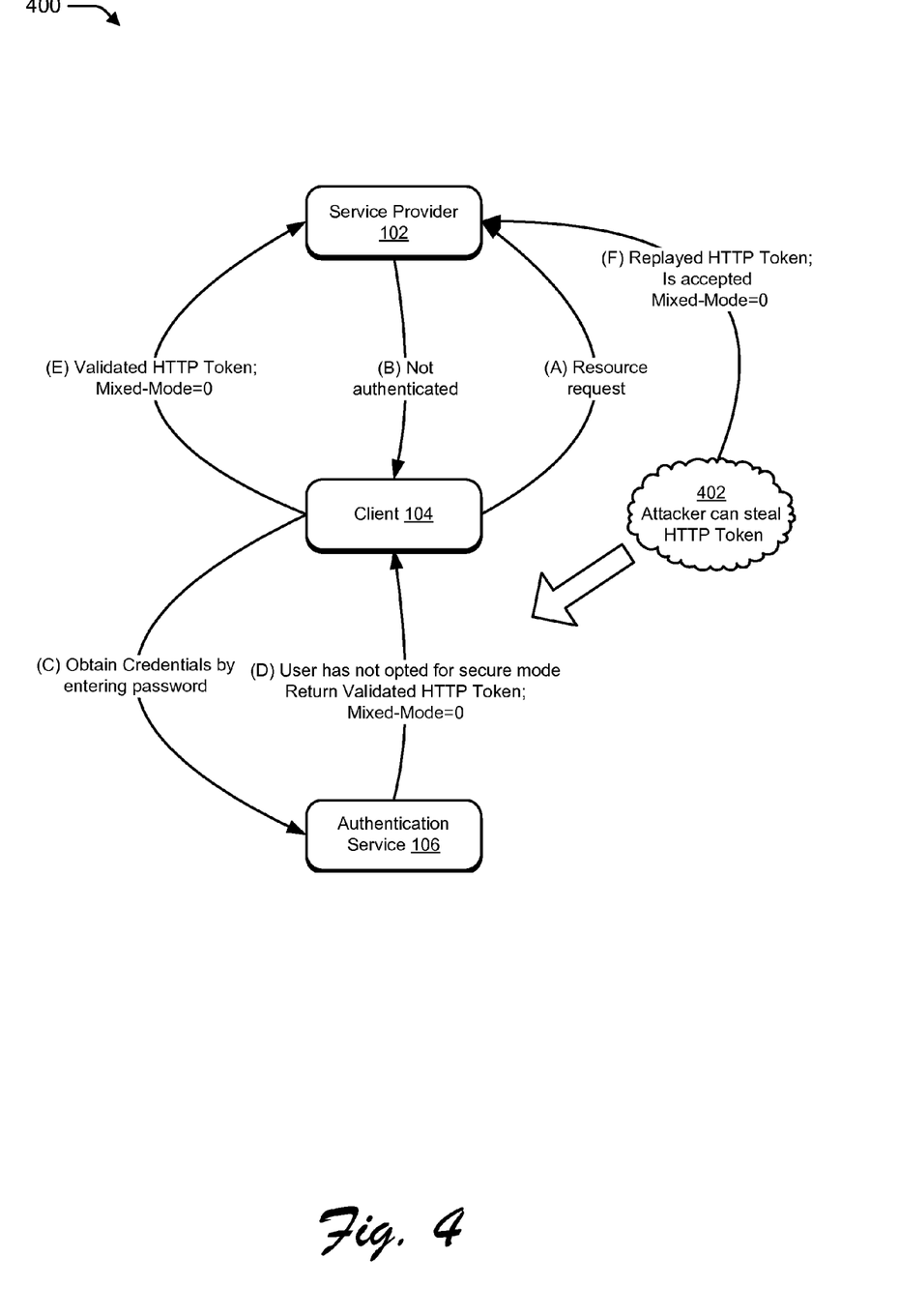
FIG. 4 is an example depiction of client-server interactions for mixed-mode authentication in an insecure mode.
Figure 5:
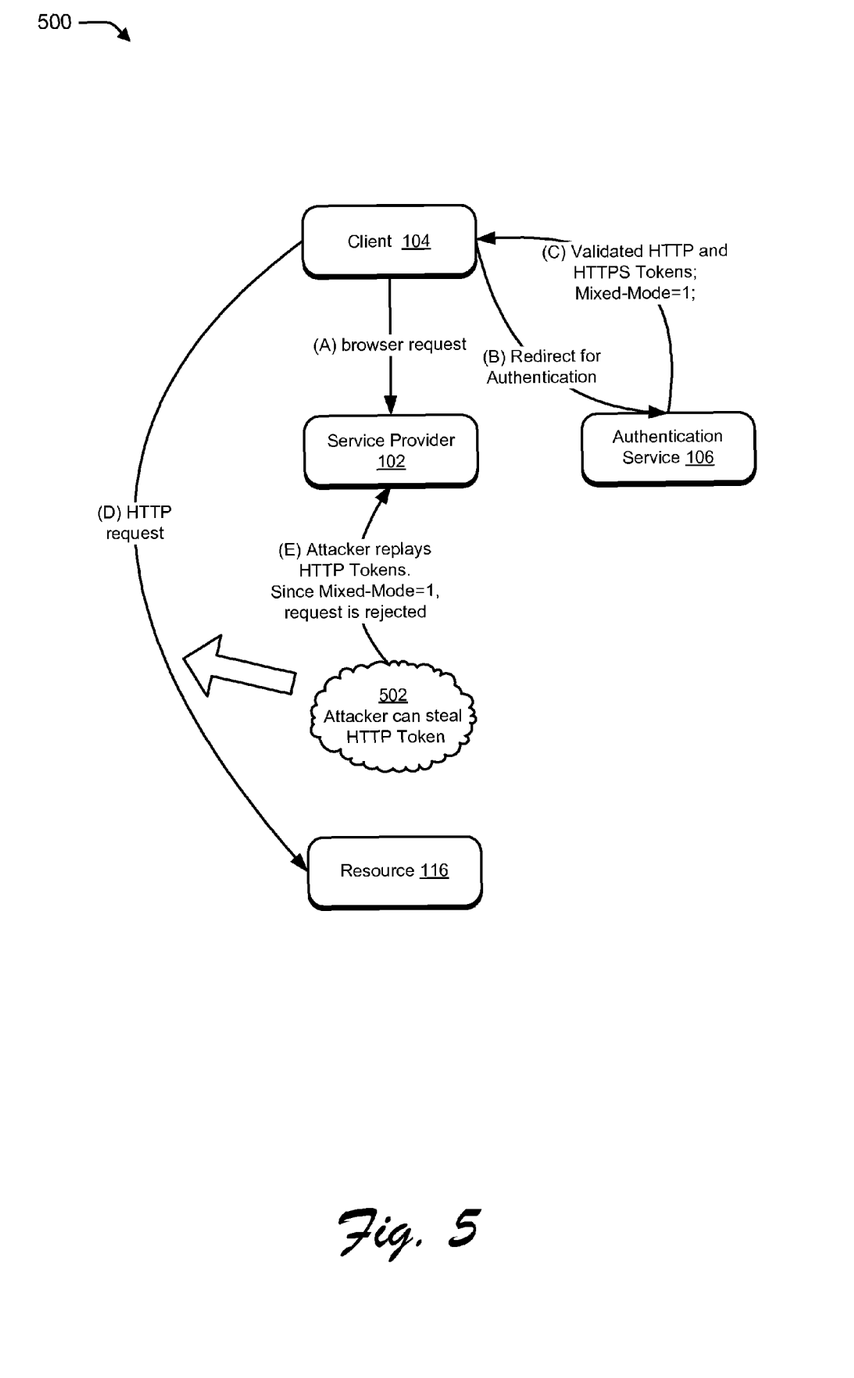
FIG. 5 is an example depiction of client-server interactions for mixed-mode authentication in a secure mode.

To further illustrate the described techniques for mixed-mode authentication, consider now a comparison of example depictions of interactions of a client 104 to obtain resources 116 from a service provider 102 using an insecure mode (FIG. 4) and a secure mode (FIG. 5). These depictions represent various example acts that can occur in the course of the interactions to obtain resources 116 and that are designated using different letters.

In particular, FIG. 4 depicts an example diagram 400 in which secure mode is disabled and accordingly a mixed-mode flag has a corresponding value of "0." A client 104 makes a resource request to a service provider 102 (Act A) and because the client 104 is not authenticated, the client 104 is redirected to an authentication service 106 (Act B). Credentials (e.g., username/password) are presented for authentication (Act C). In this example an insecure token, such as an HTTP token is returned having a mixed-mode flag with a value of "0" (Act D) in accordance with techniques described in relation to FIGS. 2 and 3. The insecure token can be presented by the client 104 (Act E) to obtain the requested resources. As represented, at 402 an attacker may steal or otherwise obtain the insecure token. This can occur at various times, such as when the token is returned to the client 104 over an insecure network, when the token is presented by the client using an insecure channel, or otherwise when the token is exposed to the attacker. The attacker can replay the token (Step F) and since the mixed-mode flag is set to "0," the service provider 102 will accept the token even if the attacker is attempting to access secure resources from a secure site (e.g., HTTPS communications).

In contrast, FIG. 5 depicts an example diagram 500 in which secure mode is enabled and accordingly a mixed-mode flag has a corresponding value of "1." Here, a browser makes a resource request to a service provider 102 (Act A) and the client 104 is again redirected to an authentication service 106 (Act B) and credentials (e.g., username/password) are presented for authentication. In this example both a secure token (e.g., HTTPS Token) and an insecure token (e.g., HTTP token) having a mixed-mode flags with a value of "1" are returned (Act C) in accordance with techniques described in relation to FIGS. 2 and 3. The insecure token can be presented by the client 104 (Act D) to obtain the resources 116 over an insecure channel or network. As represented, at 502 an attacker may steal or otherwise obtain the insecure token when this occurs. The attacker can replay the token (Step E) to attempt access to secure resources from the service provider 102. However, since the mixed-mode flag is set to "1," the service provider 102 will not accept the token for access to secure resources from a secure site (e.g., HTTPS communications). Thus, even if the token is stolen, the attacker is effectively unable to use the token.

Having considered example procedures for mixed-mode authentication, consider now example scenarios that illustrate further implementation details of mixed-mode authentication in accordance with one or more embodiments.

Mixed-Mode Authentication Implementation Examples

The following discussion describes example implementation details of mixed-mode authentication techniques that may be employed in one or more embodiments. These implementation details are described in relation to example scenarios that are illustrated in FIGS. 6-10. These scenarios represent various example acts that can occur in the course of the interactions to obtain resources and that are designated using different letters. By way of example and not limitation, secure resources and service in the following scenarios are described in the context of using Secure Sockets Layer (SSL) for secure communication. Likewise, secure tokens for the purpose of the example scenarios correspond to HTTPS tokens and insecure tokens correspond to HTTP tokens. It is to be appreciated, though, that the mixed-mode authentication techniques described herein may be employed with various secure communication protocols and corresponding tokens typically used for client-server interactions, authentications, resource provision, and access management.

Figure 6:
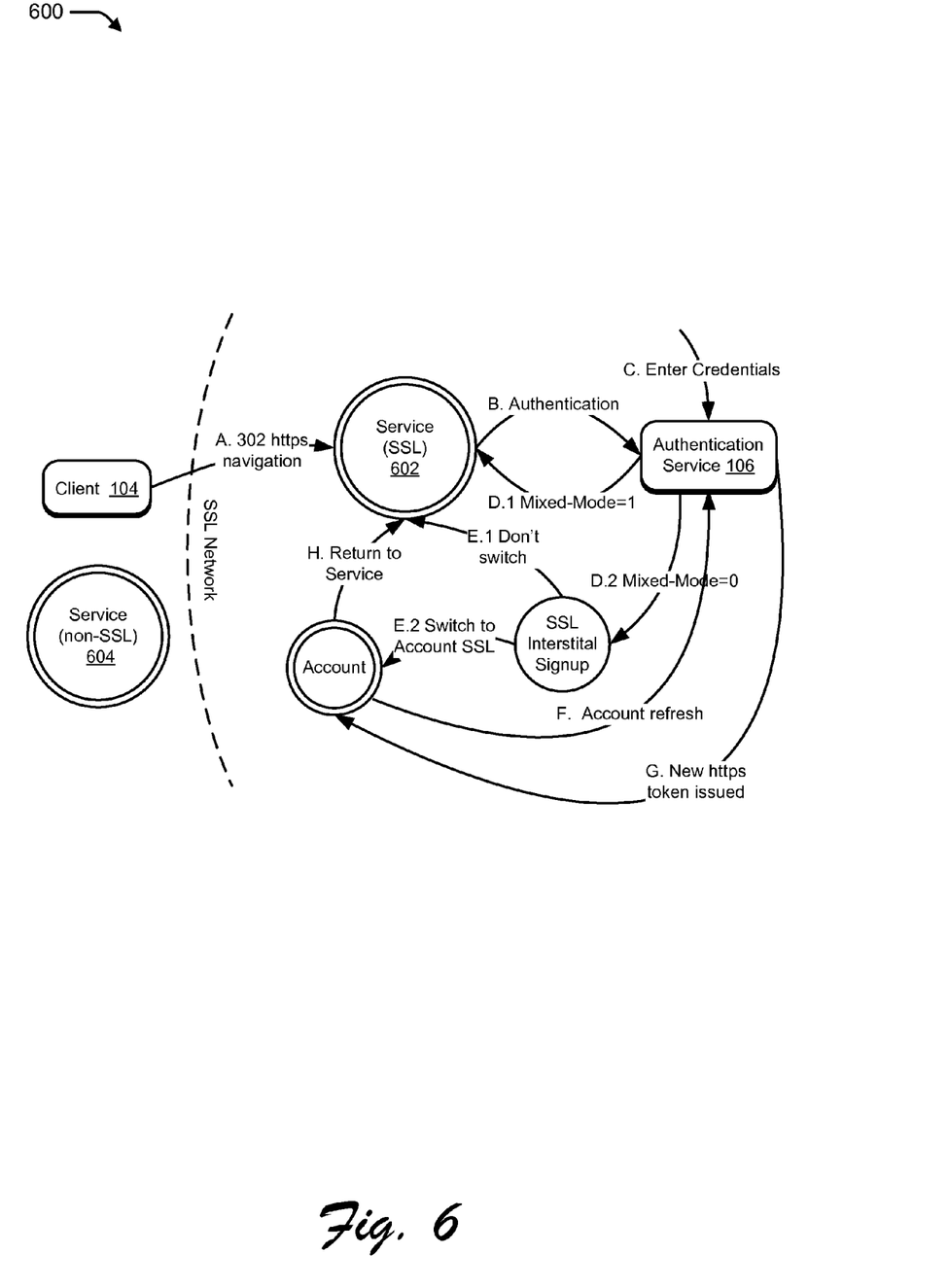
FIGS. 6-10 are illustrations of example scenarios depicting implementation details of mixed-mode authentication techniques in accordance with one or more embodiments.

FIG. 6 depicts an example scenario 600 in which an option to select secure mode is provided when a client 104 attempts to access a secure resource. FIG. 6 includes a secure service 602 configured to use SSL and an insecure service 604 that is a non-SSL service. Various services are contemplated including, but not limited to, the example services 118 described in relation to FIG. 1. A request is made to access the secure service (Act A). The client 104 is redirected for authentication (Act B) and provides credentials such as a previously obtained token (Act C). Authentication service may now determine whether secure mode is enabled for the client 104 by checking the mixed-mode flag and/or mixed-mode indicator for the user account. If secure mode is enabled (mixed-mode=1), the client is authenticated to access the secure service 602 (Act D.1). If secure mode is not enabled (mixed-mode=0), the client 104 may be redirected to an interstitial sign-up page or site (Act D.2). Here, the client 104 may be provided with an option to opt into the secure mode. For instance, the client 104 may be provided with a webpage, sign-up screen, pop-up notification, or other suitable mechanism configured to facilitate the interstitial sign-up. The interstitial sign-up may include various selectable controls to enable a selection to switch from insecure mode to secure mode. If the client 104 does not choose to switch, control is returned to the secure service 602 (Act E1), and resources may be selectively provided based upon the token presented by the client 104.

If a selection is made to switch to secure mode, an account refresh sequence is initiated to switch to secure mode (Act E.2). In this case, the mixed-mode indicator associated with a corresponding account may be set to indicate that secure mode has been enabled. Then, a redirection to the authentication service 106 is made to refresh the authentication token (Act F). Authentication service 106 may again request and verify credentials from the client 104. Upon successful verification, authentication service 106 issues a new secure HTTPS token to the client 104 (Act G). Control is returned to the secure service 602 (Act H), which provides resources to the client 104 in response to the request.

Figure 7:
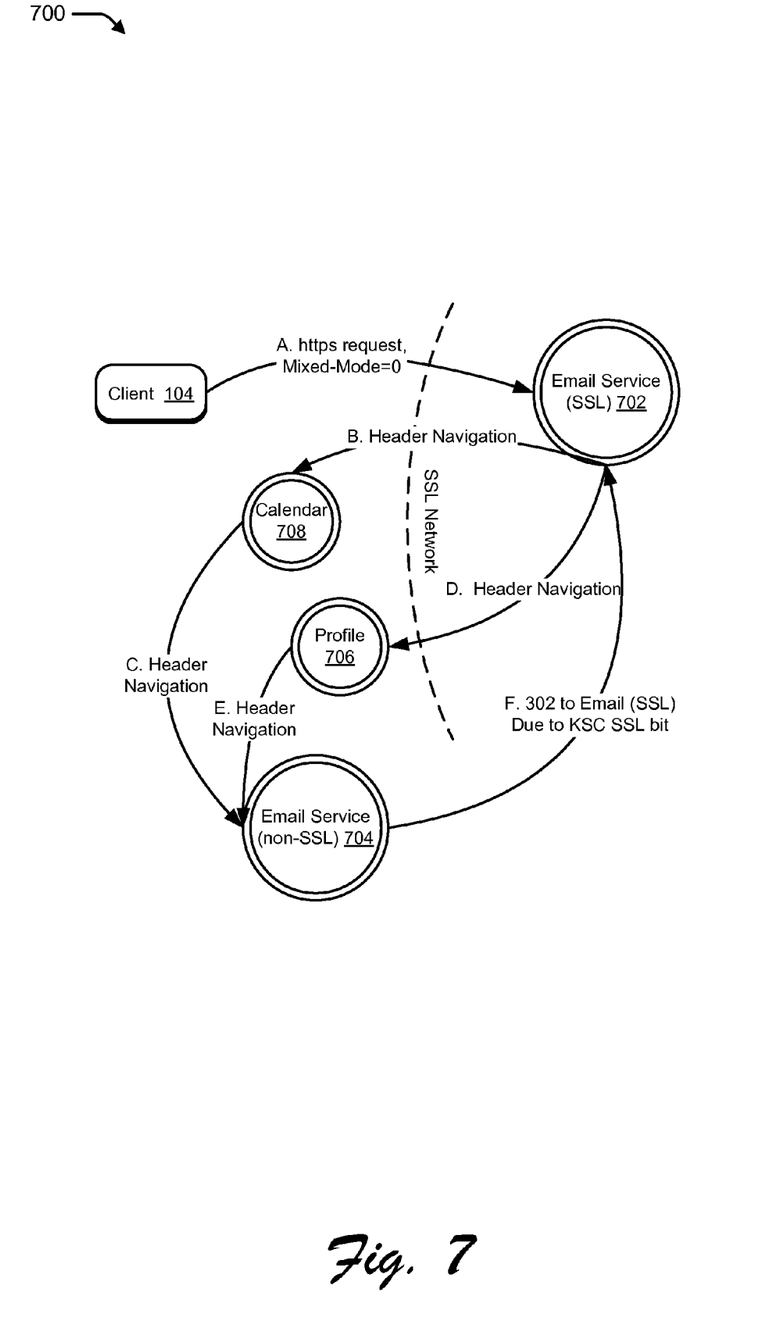

FIG. 7 depicts an example scenario 700 in which navigation between secure and insecure resources occurs in an insecure mode (mixed-mode=0). FIG. 7 includes examples services including secure email 702, insecure email 704, a profile page 706, and a calendar 708. FIG. 7 illustrates that a user who does not opt for secure mode may still navigate using HTTPS, but may cross the HTTP/HTTPS boundary as they interact with different services. For instance, client 104 may access secure email (Act A) and then navigate to access different services 118. For instance, navigation may occur from secure email 702 to calendar 708 (Act B) and then back to email (Act C). In another example, navigation may occur from secure email 702 to profile 706 (Act D) and then back to email (Act E). Note that these navigations cross the SSL boundary between secure and insecure services. Accordingly, navigation back to email is illustrated as being directed to the insecure email 704. However, a session based SSL bit can be included in the authentication token to cause redirection back to SSL when appropriate. In this example, a session based SSL bit for secure email 702 causes redirection back to secure email 702 following navigation to other unsecure services. Although, crossing the SSL boundary has some security risks, the session based SSL bit helps reduce the risks by redirecting to preserve the SSL experience as much as possible.

Figure 8:
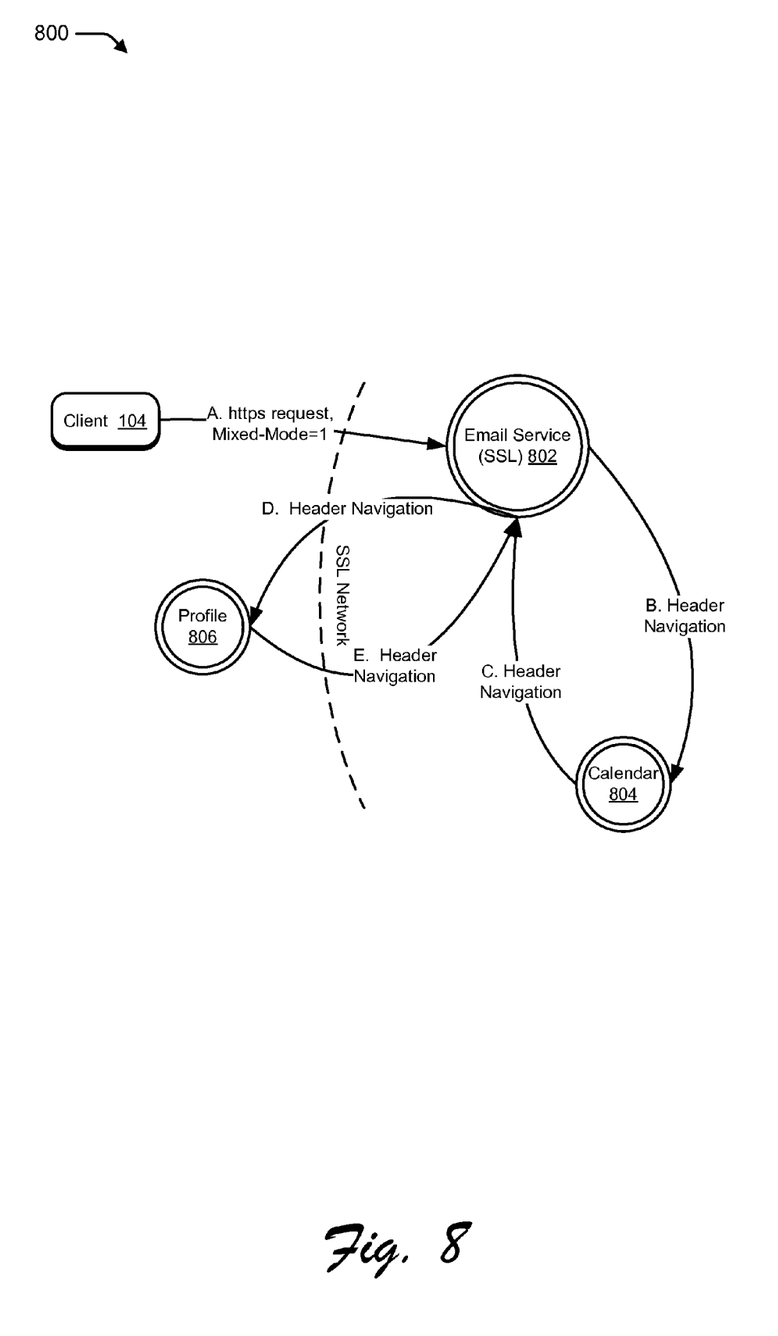

FIG. 8 depicts an example scenario 800 in which navigation between secure and insecure resources occurs in a secure mode (mixed-mode=1). FIG. 8 includes examples services including secure email 802, a calendar 804, and a profile page 806. In this example, calendar 804 represents a secure site that supports SSL. Profile page 806 represents a site that does not support SSL. FIG. 8 illustrates that when secure mode is selected, navigation to both secure sites and other sites is secure. For instance, client 104 may access secure email 802 (Act A) and then navigate to access different services 118. For instance, navigation may occur from secure email 802 to calendar 804 (Act B) and then back to email (Act C). This navigation is secure because it occurs within the SSL boundary using secure communications. In another example, navigation may occur from secure email 802 to profile 806 (Act D) and then back to email (Act E). Navigation to sites in this manner does cross the HTTP/HTTPS boundary. However, with secure mode enabled, an insecure token used for navigation to a site is secure because the mixed-mode flag prevents the insecure token from being used to access secure resources, as discussed previously. Accordingly, navigation within and across the HTTP/HTTPS boundary when secure mode is enabled as represented in FIG. 8 may be considered secure.

Figure 9:
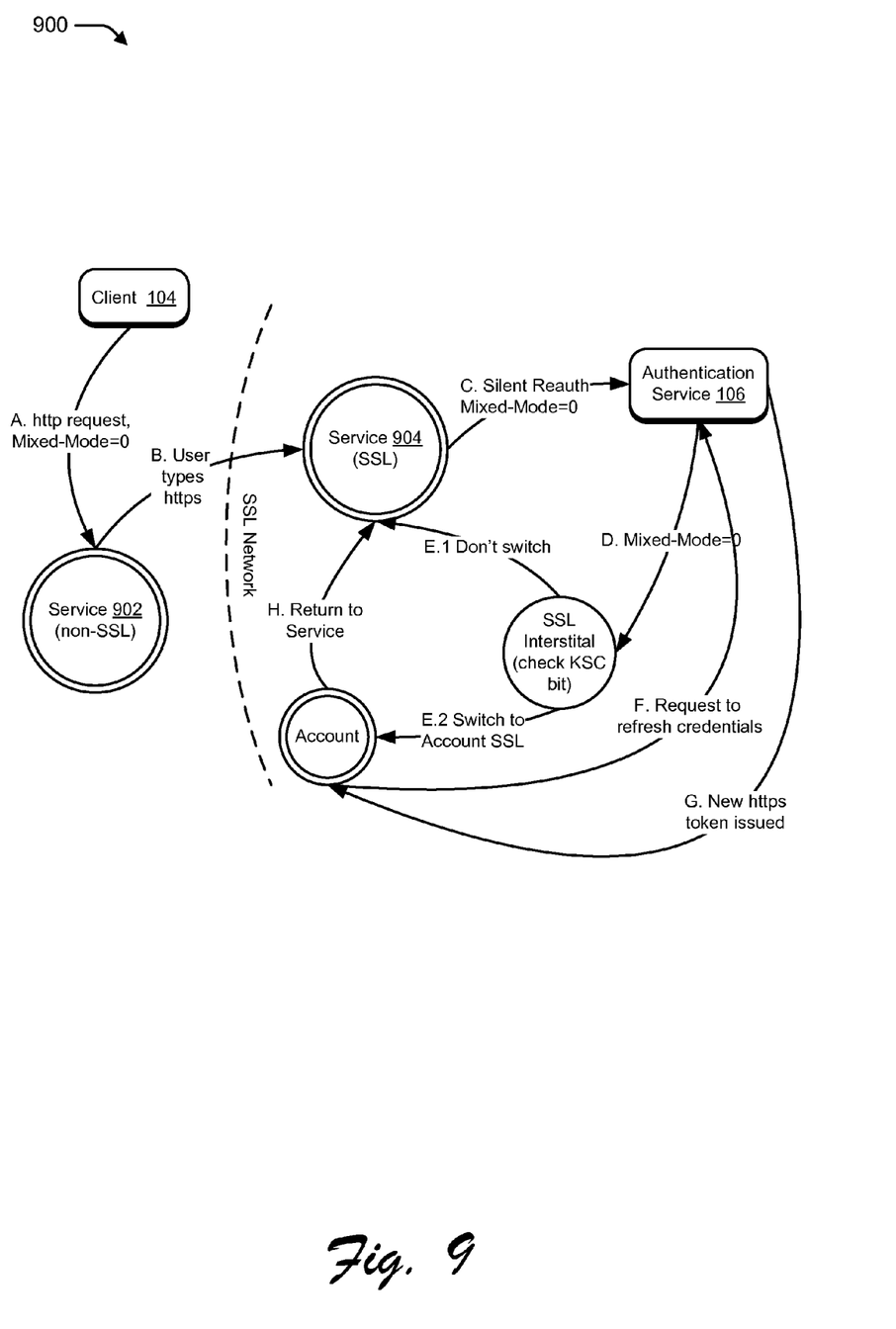

FIG. 9 depicts an example scenario 900 in which an option to select secure mode is provided when a client 104 provides input to change from viewing a web page in HTTP to HTTPS. For instance, a client 104 may login to email using HTTP and then later select HTTPS. This may occur for example by a user typing HTTPS in the address bar of the browser, selection of a link or other control, a menu item selection, and so forth. This may cause a redirection from a non-secure service 902 to a secure service 904.

When this happens, the client 104 may be provided with an option to opt into the secure mode. For instance, the client 104 may be provided with a webpage, sign-up screen, pop-up notification, or other suitable mechanism configured to facilitate the interstitial sign-up. This scenario is similar to the scenario previously described in relation to FIG. 6 except the interstitial sign-up here is initiated responsive to input to change from viewing a web page in HTTP to HTTPS, rather than in response to a log-in sequence as in FIG. 6. Once the interstitial sign-up page or other mechanism is exposed the remaining acts depicted in FIGS. 6 and 9 are substantially the same, and reference is made to the previous description of those acts.

Figure 10:
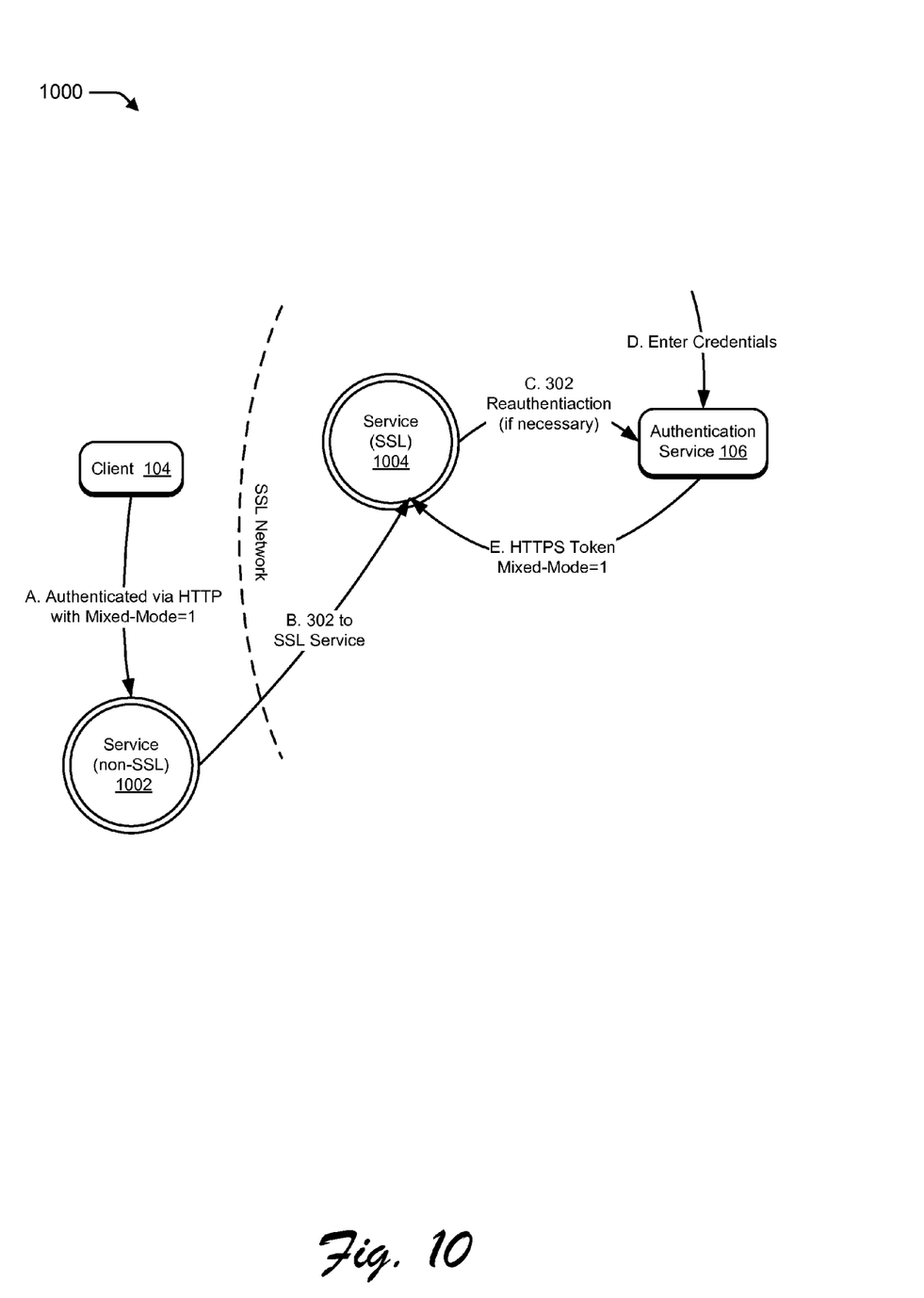

FIG. 10 depicts an example scenario 1000 in which an automatic switch to secure mode occurs when a client 104 logs in insecurely via HTTP to an account that has opted into to secure mode. In particular, the client 104 may use HTTP to access a service 118, such as the example insecure service 1002 of FIG. 10 (Act A). Assuming the client 104 has previously opted into secure mode, insecure service 1002, perhaps in conjunction with authentication service 106, may reference a mixed-mode indicator associated with a corresponding account and determine that secure mode is enabled for the account and/or client 104. Alternatively, the insecure service 1002 may be configured to determine that secure mode is enabled based on a mixed-mode flag included with an HTTP token/cookie presented by the client to access the insecure service 1002.

Accordingly, the insecure service 1002 may redirect the client 104 to a corresponding secure service 1004 that may be configured to use SSL (Act B). If the token presented is valid, the client 104 may access secure resources from the secure service 1004. If the token presented is invalid, the secure service 1004 may redirect the client for re-authentication (Act C). For example, the token may be an insecure HTTP token that the secure service will not accept because secure mode is enabled (mixed-mode=1). In this case, the client 104 may be redirected to obtain a secure HTTPS token that may be used to access secure resources from the secure service 1004. For instance, the client 104 may resubmit credentials to the authentication service 106 (Act D). Upon verification of the credentials, authentication service 106 may issue a secure HTTPS token (Act E) that is valid for access to resources from the secure service 1004. In this manner, a client 104 may be automatically upgraded to secure mode even if the client 104 logs in insecurely.

Having considered example implementation details related to mixed-mode authentication techniques, consider now a discussion of an example system and devices that may be employed to implement various aspects of the described techniques in accordance with one or more embodiments.

Example System

Figure 11:
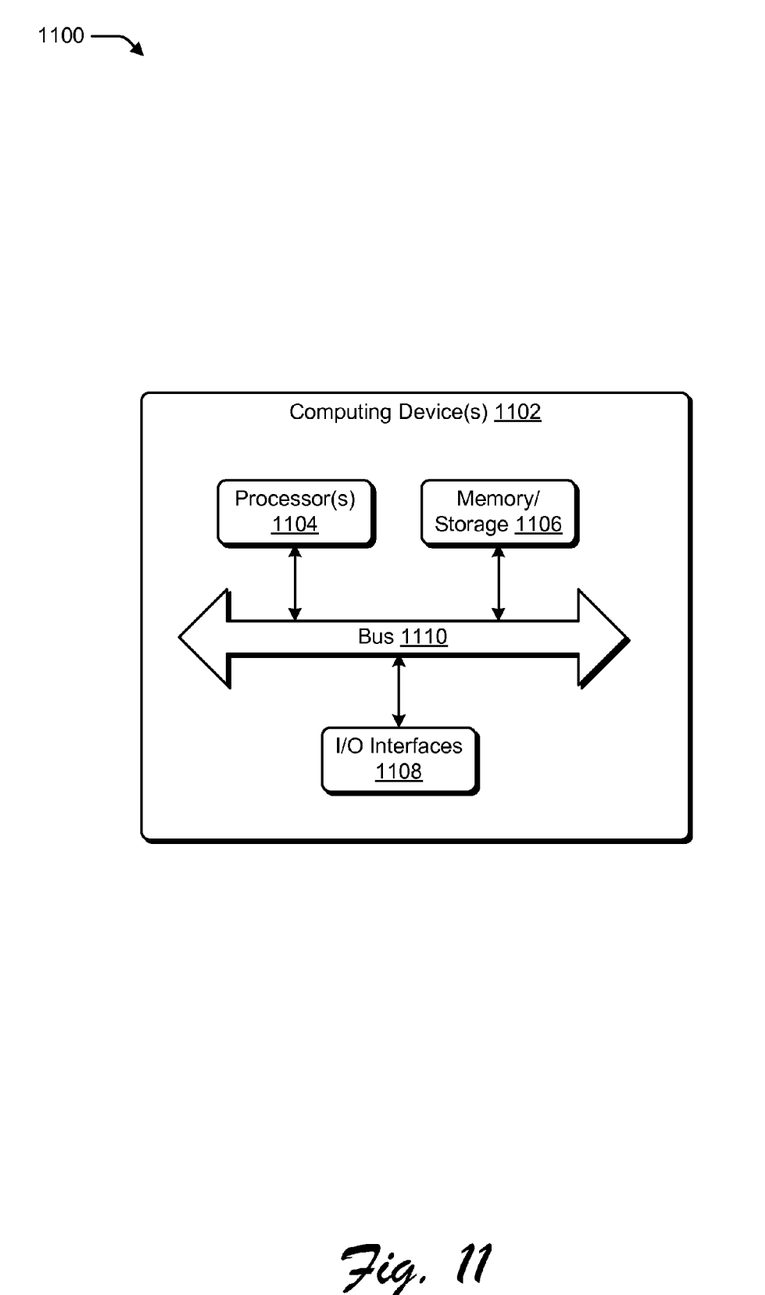
FIG. 11 is an illustration of an example system in accordance with one or more embodiments.

FIG. 11 illustrates an example system generally at 1100 that includes an example computing device 1102 that is representative of one or more such computing devices that can implement the various embodiments described above. The computing device 1102 may be, for example, a server of a service provider 102 or authentication service 106 of FIG. 1, a device associated with the client 104, and/or any other suitable computing device or computing system.

The example computing device 1102 includes one or more processors 1104 or processing units, one or more memory and/or storage components 1106, one or more input/output (I/O) interfaces 1108 for input/output (I/O) devices, and a bus 1110 that allows the various components and devices to communicate one to another. The bus 1110 represents one or more of several types of bus structures, including a memory bus or memory controller, a peripheral bus, an accelerated graphics port, and a processor or local bus using any of a variety of bus architectures. The bus 1110 can include wired and/or wireless buses.

The memory/storage component 1106 represents one or more computer storage media. The memory/storage component 1106 may include volatile media (such as random access memory (RAM)) and/or nonvolatile media (such as read only memory (ROM), Flash memory, optical disks, magnetic disks, and so forth). The memory/storage component 1106 may include fixed media (e.g., RAM, ROM, a fixed hard drive, etc.) as well as removable media (e.g., a Flash memory drive, a removable hard drive, an optical disk, and so forth).

The one or more input/output interfaces 1108 allow a user to enter commands and information to computing device 1102, and also allow information to be presented to the user and/or other components or devices using various input/output devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer-readable media. The computer-readable media may include a variety of available medium or media that may be accessed by a computing device. By way of example, and not limitation, computer-readable media may comprise "computer-readable storage media."

Software or program modules, including the communication module 130, authentication manager 122, resource manager 114, and other program modules, may be embodied as one or more instructions stored on computer-readable storage media. The computing device 1102 may be configured to implement particular functions corresponding to the software or program modules stored on computer-readable storage media. Such instructions may be executable by one or more articles of manufacture (for example, one or more computing devices 1102, and/or processors 1104) to implement techniques for mixed-mode authentication, as well as other techniques. Such techniques include, but are not limited to, the example procedures described herein. Thus, computer-readable storage media may be configured to store instructions that, when executed by one or more devices described herein, cause various techniques for mixed-mode authentication.

The computer-readable storage media includes volatile and non-volatile, removable and non-removable media and/or storage devices implemented in a method or technology suitable for storage of information such as computer readable instructions, data structures, program modules, or other data. Computer-readable storage media may refer to media and/or devices that enable persistent and/or non-transitory storage of information in contrast to mere signal transmission. The computer-readable storage media can include, but is not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

Conclusion

Although the mixed-mode authentication techniques have been described in language specific to structural features and/or methodological acts, it is to be understood that the appended claims are not necessarily limited to the specific features or acts described. Rather, the specific features and acts are disclosed as example forms of implementing the mixed-mode authentication techniques.

What is claimed is:

1. A method comprising:
obtaining an authentication request from a client for access to resources from a service provider;
performing mixed-mode authentication to authenticate the client including determining whether a secure mode for the authentication is enabled; and
responsive to authentication of the client, issuing one or more tokens to the client based on the determining, such that:
a secure token and an insecure token configured for access to secure and insecure resources, respectively, are issued when the secure mode is enabled; and
an insecure token configured for access to both secure and insecure resources is issued to the client when the secure mode is disabled.

2. The method as described in claim 1, wherein determining whether the secure mode is enabled comprises referencing a mixed-mode indicator that is:
configured to indicate whether secure mode is enabled or disabled; and
associated with an account corresponding to the client from which the authentication request is obtained.

3. The method as described in claim 1, wherein the secure resources are secured using Secure Sockets Layer (SSL) protocol.

4. The method as described in claim 1, wherein performing mixed-mode authentication to authenticate the client further includes:
validating credentials provided by the client;
determining the client is authenticated and issuing the one or more tokens to access the resources when the credentials are valid; and
determining the client is not authenticated and denying access to the resources when the credentials are invalid.

5. The method as described in claim 1, further comprising configuring the one or more tokens to include a mixed-mode flag that indicates whether secure mode is enabled or disabled.

6. The method as described in claim 5, wherein the mixed-mode flag that indicates whether secure mode is enabled or disabled is configured to be detectable by a service provider to differentiate between the insecure token issued when secure mode is enabled and the insecure token issued when secure mode is disabled.

7. The method as described in claim 1, wherein the insecure token issued when secure mode is enabled is configured to be rejected when presented for access to secure resources to prevent unauthorized access to the secure resources if the insecure token is stolen.

8. The method as described in claim 1, wherein:
the secure resources comprise resources from the service provider that are accessible by the client over a network using Hypertext Transfer Protocol Secure (HTTPS); and
the insecure resources comprise resources from the service provider that are accessible by the client over the network via Hypertext Transfer Protocol (HTTP).

9. The method as described in claim 1, further comprising:
determining that secure mode for the authentication is disabled; and
redirecting the client to an interstitial sign-up site to provide the client with an option to enable secure mode.

10. The method as described in claim 1, wherein the secure token and the insecure token issued in response to enabling of the secure mode are issued in response to a single sign-on and provide access to multiple resources including a suite of services available from the service provider.

11. The method as described in claim 1, further comprising:
obtaining the insecure token issued when secure mode is enabled in another authentication request to access secure resources available from the service provider;
determining that secure mode is enabled by referencing a flag included with the insecure token; and
denying access to the secure resources using the insecure token based upon the determination that secure mode is enabled.

12. The method as described in claim 1, wherein:
the secure token is configured as a Hypertext Transfer Protocol Secure (HTTPS) cookie that is compatible with sites that use secure communications; and
the insecure token issued is configured as a Hypertext Transfer Protocol Secure (HTTP) cookie that is compatible with sites that do not support secure communications.

13. One or more computer-readable storage devices comprising instructions stored thereon that, in response to execution by one or more components of a computing system, cause the computing system to implement an authentication service to perform operations to authenticate clients to access resources over a network from a service provider, the operations including for each client that is authenticated:
   determining whether a secure mode for authentication is enabled or disabled for the client; and
   responsive to the determination that the secure mode is enabled, issuing to the client both a secure token to enable access to secure sites of the service provider that use secure communications and an insecure token to enable access to other sites of the service provider that do not support secure communications, the insecure token configured to include a indication that secure mode is enabled that is detectable by the secure sites and causes the secure sites not to accept the insecure token.

14. One or more computer-readable storage devices as described in claim 13, wherein the operations further include responsive to the determination that the secure mode is disabled, issuing to the client a single insecure token configured to be accepted by both the secure sites and the other sites of the service provider.

15. One or more computer-readable storage devices as described in claim 13, wherein the operations further include configuring a mixed-mode flag included with tokens that are issued by the authentication service to indicate whether the secure mode is enabled.

16. A system comprising:
   one or more processing devices;
   one or more computer-readable memories storing instructions that, responsive to execution by the one or more processing devices, cause the one or more processing devices to implement an authentication service operable to:
   selectively issue tokens to authenticated clients to enable access to resources from a service provider based upon a determination regarding whether a secure mode is enabled or disabled for the authenticated clients, including for each client:
      issuing both a secure token and an insecure token to the client when the secure mode is enabled for the client; or
      issuing a single insecure token to the client when the secure mode is disabled for the client; and
   configure a mixed-mode flag included with tokens that are issued to the authenticated clients to indicate whether the secure mode is enabled.

17. The system as described in claim 16, wherein the authentication service is further operable to:
   detect the mixed-mode flag included with a particular token when the particular token is presented by a client to gain access to secure resources from a secure site; and
   reject the particular token when the mixed-mode flag indicates that secure mode is enabled and the particular token is an insecure token.

18. A system as described in claim 16, wherein the secure token and the insecure token issued when secure mode is enabled comprise, respectively:
   a Hypertext Transfer Protocol Secure (HTTPS) cookie that is compatible to access resources from secure sites that use Secure Sockets Layer (SSL) and
   a Hypertext Transfer Protocol (HTTP) cookie that is compatible to access resources from other sites that do not support Secure Sockets Layer (SSL).

19. A system as described in claim 18, wherein the insecure token issued when secure mode is disabled comprises Hypertext Transfer Protocol (HTTP) cookie that is compatible to access resources from both secure sites that use Secure Sockets Layer (SSL) and other sites that do not support Secure Sockets Layer (SSL).

20. A system as described in claim 16, wherein the authentication service is further operable to:
   determine when secure mode is disabled for a particular client; and
   present the particular client with an option to enable secure mode in response to the determination.

* * * * *